May 14, 1940.   L. G. HOOK   2,200,552
SPILL BOOM
Filed Nov. 28, 1938
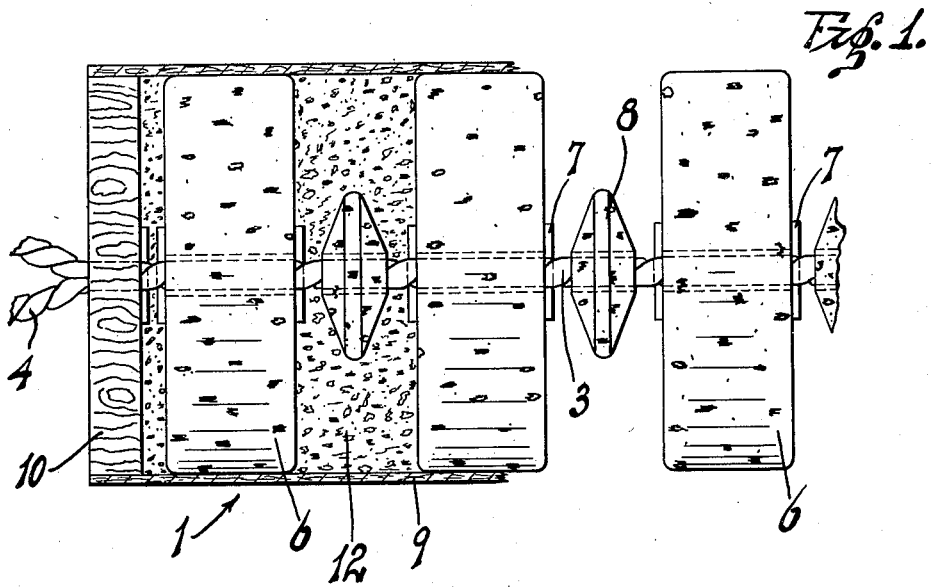
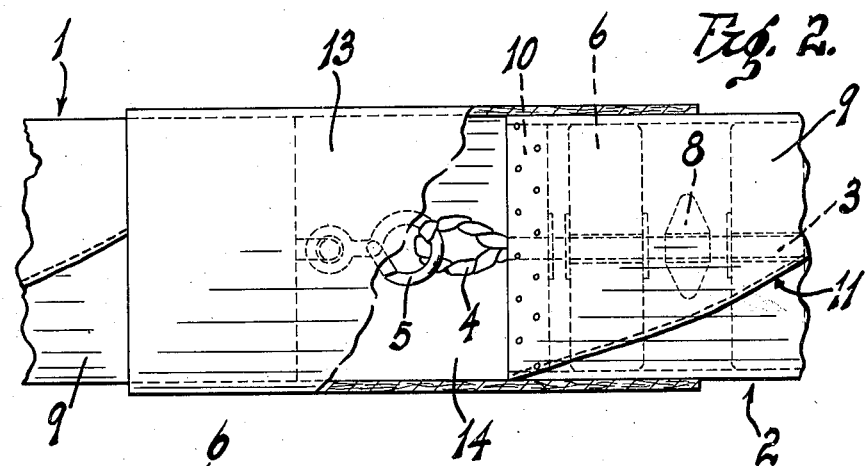
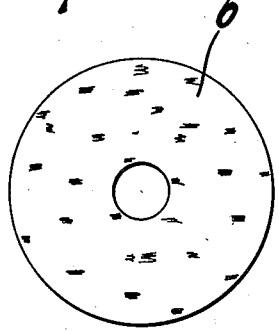
INVENTOR.
LEROY G. HOOK.
BY
ATTORNEY.

Patented May 14, 1940

2,200,552

UNITED STATES PATENT OFFICE 2,200,552

SPILL BOOM

Leroy G. Hook, San Pedro, Calif.

Application November 28, 1938, Serial No. 242,709

10 Claims. (Cl. 9—8)

This invention relates to a spill boom whereby various liquids which might be accidentally spilled on the water can be confined to a limited area and recovered, so that a minimum of damage will be done by this liquid. Particularly, my invention serves to confine oil of various types which might be accidentally spilled on water while loading or unloading a ship, or the like.

An object of my invention is to provide a spill boom which will float on the surface of the water and which can be moved to the place desired and placed around the effected area, so that a minimum of damage will result from oil which has accidentally been spilled into the water.

A feature of my invention resides in the novel construction and arrangement of parts, namely the spaced floats encased within a fireproof cover.

Another object of my invention is to provide a spill boom which is sturdy in construction and which can be placed on a large reel when not in use.

Another feature of my invention resides in a spill boom which is constructed in sections of any desired length, the various sections being attachable each to the other so that a spill boom can be constructed of any desired length.

Other objects, advantages and features of invention may appear from the accompanying drawing, the subjoined detailed description and the appended claims.

In the drawing:

Figure 1 is a fragmentary, sectional view of my spill boom with the floats and the mounting cable shown in elevation.

Figure 2 is a side elevation of my spill boom, with parts broken away to show the coupling element.

Figure 3 is an end view of one of the floats.

Referring more particularly to the drawing, the spill boom consists of long sections 1—2, which are coupled to the adjacent sections in a manner to be hereinafter described. A cable 3 extends axially through each of the sections, and one end of the cable is formed with a loop 4, and the other end of the cable is provided with a suitable releasable attachment such as the hook 5. A plurality of floats 6 are threaded on the cable 3, and are spaced a suitable distance apart. The floats are held against longitudinal movement on the cable by means of pins or washers 7, which bear against each side of the float and are fixedly attached to the cable. If these devices are pins, they are driven through the cable. A spacing float 8 is mounted on the cable 3 between each of the adjacent floats 6. The floats 8 are preferably formed as disks, the disks tapering towards the periphery so that the outer edges of the float 6 can move towards each other without interference when the boom is curved to encircle or enclose a given area on the water.

To prevent the oil or the like floating on the water from passing between adjacent floats 6, I provide a cover or sleeve 9, which extends the entire length of each of the boom sections. The cover 9 closely fits the periphery of the floats 6. However, the floats can move longitudinally within the cover in order to arrange themselves when the boom is curved.

A wood block 10 is mounted on the cable 3 at each end of each of the sections, and the cover 9 is nailed or otherwise fixedly attached to the end blocks 10. The cover 9 is preferably formed of some fireproof material, such as asbestos, interwoven with metal threads. The cover 9 is preferably spirally wound onto the floats 6, thus providing a spiral closing seam 11. Due to this spiral mounting of the cover, a longitudinal stretch or give is permitted so that this cover will not readily tear. The floats 6 and 8 are preferably formed of cork, although other materials might be used, if desired.

As now contemplated, the floats 6 will be approximately eight (8) inches in diameter, and approximately four and one-half (4½) inches of the boom will project above the surface of the water. Thus, an effective boom or barrier is provided behind which oil or the like can be accumulated and subsequently withdrawn or dispensed with in some suitable manner.

If desired, the space between adjacent floats 6 can be filled with loosely packed cork, or other like material, 12. This loosely packed material will lend additional buoyancy to the boom and also will serve to keep the floats in proper spaced arrangement. It is understood that the cork or the like 12 must be quite loosely packed so that the outer ends of the float 6 can move back and forth when the boom is curved to encircle an affected area.

A sleeve 13 extends over the space 14 between adjacent boom sections, thus closing this space and preventing leakage of the oil therethrough. The sleeve 13 is slidable on each boom section and after the boom sections are coupled together, this sleeve is moved over the opening, thus providing a continuous closed boom.

The loosely packed cork 12 between the floats will also act as an effective barrier or dam to prevent oil and the like from passing through the cover and thence between the floats. The cover is usually formed of a rather loosely woven material, and consequently the loose cork will aid in preventing quantities of oil from passing through the boom.

Having described my invention, I claim:

1. A device for confining spilled oil on the surface of the water comprising a series of spaced interconnected floats and a cover of uniform diameter throughout its length enclosing said spaced floats, said cover being formed of fireproof material.

2. A device for confining spilled oil on the surface of the water comprising a series of spaced interconnected floats, a tubular cover formed of fibrous fireproof material and being uniform throughout its length enclosing all of said floats.

3. A device for confining spilled oil on the surface of the water comprising a flexible element, a series of floats mounted in spaced relation thereon, means for preventing longitudinal shifting movement of the floats on the flexible supporting element, and a fireproof cover enclosing the floats, said cover being spirally wrapped over the floats.

4. A device for confining spilled oil on the surface of the water comprising a plurality of sections; each of which includes a flexible element, a series of spaced floats mounted on the flexible element, a cover enclosing the floats and means for detachably connecting the adjacent ends of the sections together, and a sleeve fitted over the coupled ends of the sections.

5. A device for confining spilled oil on the surface of the water comprising a series of spaced floats, a cover enclosing the floats, and loosely packed buoyant material between the adjacent floats and confined within the cover.

6. A device for confining spilled oil on the surface of the water comprising a flexible element, a series of floats mounted in spaced relation thereon, a tubular cover of uniform diameter throughout its length enclosing the floats and flexible supporting element, and loosely packed buoyant material filling the spaces between the adjacent floats and confined within said cover.

7. A device for confining spilled oil on the surface of the water comprising a flexible supporting element, a series of spaced floats mounted thereon, means to prevent slidable shifting of the floats on the flexible supporting element, a tubular cover of uniform diameter throughout its length enclosing the floats, said cover being formed of a piece of fireproof fabric wrapped spirally around the flexible supporting element and the floats thereon, and loosely packed buoyant material filling the spaces between the adjacent floats and confined within the cover.

8. A device for confining spilled oil on the surface of the water, comprising a series of spaced inter-connected floats, a spacing float between said inter-connected floats, said spacing floats being tapered, and a cover of uniform diameter throughout its length, enclosing said spaced floats.

9. A device for confining spilled oil on the surface of the water, comprising a series of spaced inter-connected floats, a spacing float between said inter-connected floats, said spacing floats being tapered, and a cover of uniform diameter throughout its length, enclosing said spaced floats, said cover being formed of fireproof material.

10. A device for confining spilled oil on the surface of the water, comprising a flexible element, spaced floats mounted on the flexible element, spacing floats arranged between the first-named floats and on said flexible element, said spacing floats being tapered, and a cover of uniform diameter throughout its length enclosing the floats and the flexible element.

LEROY G. HOOK.